United States Patent Office 2,852,491
Patented Sept. 16, 1958

2,852,491

LINEAR POLYESTERS CONTAINING N-SUBSTITUTED AMINES

John R. Caldwell, Kingsport, Tenn., assignor to Eastman Kodak Company, Rochester, N. Y., a corporation of New Jersey No Drawing. Application March 11, 1954
Serial No. 415,701

11 Claims. (Cl. 260—75)

This invention relates to polymeric materials, and particularly to fiber-forming linear polymers having improved dyeing properties.

A large number of synthetic linear condensation polymers are known to the art, and such polymers are ordinarily prepared by reacting a polybasic organic acid with a polyhydric alcohol, with or without the use of a condensation catalyst. The high molecular weight products which are thereby obtained are capable of being drawn into oriented fibers of the type described in U. S. Patent 2,071,250. The usual polyester fibers, such as those prepared from polyethylene terephthalate, are very difficult to dye, however, and special methods are usually employed in order to achieve any satisfactory degree of dyeing. Thus, at the present time, polyester fibers must be dyed at super atmospheric pressures with cellulose acetate dyes in order to obtain practical shades. This process requires the use of expensive equipment and is time consuming. An alternative process which has been used involved effecting the dyeing in the presence of a dye assistant or swelling agent such as phenol, cresol, benzoic acid, dichlorobenzene, or similar material. This process suffered the disadvantage, however, of often causing non-uniform swelling of the fiber with a resultant non-uniform application of the dye. Furthermore, most of the dyeing assistants were objectionable to use because of expense, toxicity, objectionable odor, or similar disadvantage.

It is accordingly an object of this invention to provide new linear polyesters from which fibers can be prepared which have improved dye affinity, especially for cellulose acetate type dyes.

Another object of the invention is to provide new and improved linear polyesters containing an N-substituted amine in the main molecular chain.

Another object of the invention is to provide new and improved polyesters suitable for the manufacture of fibers which can be dyed to practical shades under ordinary conditions with or without the use of super atmospheric pressures or dyeing assistants.

Another object of the invention is to provide a method for incorporating an N-substituted hydroxyamine or diamine into high molecular weight, fiber-forming polyesters.

Another object of the invention is to improve the dyeing properties of polyester fibers without substantially altering the melting point, tensile strength, elongation, or elastic recovery of the fibers.

Other objects will be apparent from the description and claims which follow.

These and other objects of the invention are accomplished by condensing to form a linear polymer a polycarboxylic compound which can be either a polybasic organic acid or an ester thereof, a polyhydroxylic compound which can be either a polyhydric alcohol or an ester thereof, and an N-substituted amine of the formula

R'—NH—R—X wherein R is either a straight or branched chain alkyl group containing from 2 to 6 carbon atoms, R' is either a straight or branched chain alkyl group containing from 1 to 6 carbon atoms or a phenyl, tolyl, xylyl or chlorophenyl group and X is either an –OH group or a –NHR' group.

The terpolymers of high molecular weight which are thus obtained can be drawn into oriented fibers which have improved affinity for dyes, and particularly for cellulose acetate type dyes. The modified polyesters prepared in accordance with this invention retain the desirable physical and chemical properties of the polyesters usually prepared by coreacting the polyhydric alcohol and the polybasic organic acid, and in addition have the improved properties imparted by the presence of the N-substituted amine groups in the main molecular chain.

The usual polyester fibers, such as polyethylene terephthalate, are very difficult to dye because the highly crystalline structure of the drafted and heat-set fiber is so dense that the dye molecules can penetrate the surface only with great difficulty and at a very low rate of diffusion. This is discussed in detail by Remington, Am. Dye Reporter, 41, 859 (1952) and by Edgar and Hill, J. Poly. Sc., 8, 1 (1952).

The invention is not intended to be restricted by any theory which might be advanced herein, but it appears that the polyesters modified in accordance with this invention have improved dyeing properties because the side-chains on the nitrogen atoms prevent segments of the molecule from entering into a crystalline lattice and hence give rise to amorphous zones or areas in the fiber structure into which the dye molecules can penetrate at a relatively rapid rate. Furthermore, an amide group is present in such amorphous zone and hence is readily available for association with the dye molecule. Such amide groups usually increase the affinity for most types of dyes; and, in many cases, increase the fastness of dyes toward light and laundering. Thus, the fibers prepared in accordance with the invention can be dyed readily with cellulose acetate dyes and also show some affinity for certain classes of acid wool, direct cotton and vat dyes. Another advantage of the N-substituted amines employed in accordance with this invention is that the polymers are much more stable when the amide nitrogen atom does not contain a hydrogen atom. A further advantage is that the N-substituted amine modified polymers retain a desirably high melting temperature unlike polymers containing such unsubstituted amines as monoethanol amine.

The terpolymers of this invention are conveniently prepared by heating a mixture of the polybasic acid, preferably in ester form, polyhydric alcohol, and N-substituted amine as herein defined at atmospheric pressure, and preferably in the presence of a suitable condensation catalyst such as an amphoteric metal compound. The condensation reaction is desirably effected under an atmosphere of nitrogen and at a temperature of from about 150 to 300° C., and preferably from about 200 to 300° C. Preferably, the reactants are first heated to 140–180° C. for 1–2 hours to form the amide. The condensation reaction is carried out until the product has a sufficiently high molecular weight to exhibit fiber-forming properties. The fiber-forming stage can be checked by touching the molten polymers with a rod and drawing the rod away. When the fiber-forming stage has been reached, a continuous filament of considerable strength will be pulled from the melt in this manner. This stage is generally reached when the polymer has an intrinsic viscosity of at least 0.4, the intrinsic viscosity being defined as $$\frac{\log_e N_r}{C}$$

in which $N_r$ is the viscosity of a dilute solution of the polymer in m-cresol divided by the viscosity of m-cresol in the same units and at the same temperature, and $C$ is the concentration in grams of polymer per 100 cc. of solution. Measurement of the intrinsic viscosity is generally the most convenient method for following the course of the reaction. In most cases, it is usually desirable to continue the reaction until the intrinsic viscosity is above 0.4, and preferably above 0.6. The polymers thus obtained have excellent fiber-forming and cold drawing properties in addition to high melting points, tensile strength, elongation and elastic recovery. These polymers are crystalline, linear polymers which can be formed into fibers which are oriented along their axis.

Although the amine is usually added to the polyester reactants at the start of the reaction and converted to the amide by heating initially at 140–180° C., the N-substituted amine alternatively can be first converted to the amide of the acid being used in forming the polyester. Thus, for example, the N,N'-diphenyl-N,N'-dihydroxyethylamide of terephthalic acid or p,p'-sulfonylbizenoic acid can be used as a reactant prepared by such prereaction. Similarly, the amino compound can be used in the form of a derivative of an acid that is being used only as a minor constituent of the polyester. For example, one mole of N-phenyl ethanolamine can be reacted with one mole of succinic anhydride to give N-phenyl-N-hydroxyethyl succinanic acid which is then used in forming the polyester. In a similar manner, one mole of N,N'-diphenyl ethylene diamine can be reacted with 2 moles of succinic anhydride to give a polyester reactant of the formula

HOOC(CH₂)₂CO—N—CH₂CH₂—N—CO(CH₂)₂COOH

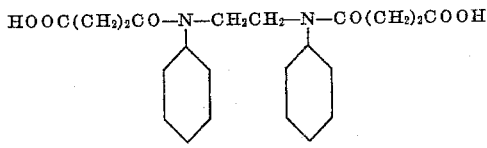

It will therefore be understood that the invention includes coreacting the unreacted N-substituted amine with the polycarboxylic compound and polyhydroxylic compound as well as first reacting the N-substituted amine with either the polycarboxylic compound to be used as a primary reactant in making the polyester or another polybasic acid and then reacting the product with the polyhydroxylic compound or compounds and additional polybasic acid if desired.

In practicing the invention, any of the N-substituted amines as defined herein can be used including the hydroxyamines and the diamines. Thus, the N-substituted amines of the invention include but are not limited to hydroxyamines such as N-methyl ethanolamine, N-ethyl ethanolamine, N-isopropyl ethanolamine, N-phenyl ethanolamine, N-butyl-3-amino-propanol, N-ethyl-4-aminobutanol, N-tolyl-5-aminopentanol, N-xylyl-6-aminohexanol, N-phenyl-3-amino-2-methyl propanol and similar N-substituted hydroxyamines, as well as diamines such as N,N'-diethyl ethylenediamine, N,N'-dimethyl trimethylenediamine, N,N'-dibutyl hexamethylenediamine, N,N'-diphenyl ethylenediamine, N,N'-diphenyl tetramethylenediamine. N,N'-diphenyl-2-methyl-propanediamine-1,3, N,N-ditolyl ethylenediamine and similar N-substituted diamines. The polyesters of the invention preferably contain from about 5% to about 20%, and preferably from 10% to 16% of the amino compound on a molar basis in the polyester. In the process embodying this invention, the N-substituted amine as the amide enters directly into the polymer chain and hence modifies the polymer in its molecular structure unlike the modification which is obtained by attempting to modify a preformed polymer ester.

In practicing the invention, the N-substituted amine is reacted with a polybasic organic acid, or an ester thereof, and with a polyhydric alcohol which can be in the form of the free alcohol or esterified as described hereinafter.

The reaction is desirably effected in the presence of a condensation catalyst and preferably an organo-metallic catalyst, a large number of which are described in the copending applications of John R. Caldwell, Serial Nos. 313,061 through 313,071 inclusive, filed October 3, 1952 now U. S. Patents 2,744,089–97 inclusive, 2,744,078 and 2,744,129. The catalysts which are preferred for use in practicing this invention are the titanium compounds specifically disclosed in application Serial No. 313,072 now U. S. Patent 2,720,502, tin compounds as disclosed in application Serial No. 313,078, now U. S. Patent 2,720,506, and aluminum compounds as disclosed in application Serial No. 313,077 now U. S. Patent 2,720,507. When such catalysts are employed in preparing the polyester, the esterfied polybasic acids and esterified polyhydric alcohols can be readily used instead of the free acids and free polyhydric alcohols. It will, therefore, be understood that this invention includes the use of such acids and alcohols in the form of their esters as well as in the unesterified form, and includes the use of any condensation catalyst or no catalyst in accordance with usual practices.

Thus in practicing the invention any of the well known polybasic organic acids, and particularly the dibasic dicarboxylic acids can be employed for preparation of the modified polymers. These acids include the aliphatic dibasic acids or esters thereof of the formula $$R_1OOC—R_2—COOR_3$$

wherein $R_1$ and $R_3$ are either hydrogen or alkyl radicals containing from 1 to 10 carbon atoms, and $R_2$ is an aliphatic hydrocarbon radical. Thus typical aliphatic dibasic dicarboxylic acids which can be employed include oxalic acid, succinic acid, adipic acid, sebacic acid, α,α-dimethyl glutaric acid, dimethyl malonic acid, diglycollic acid, β-oxydipropionic acid, γ-oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

The invention is advantageously carried out employing an aromatic dicarboxylic acid or a diester thereof of the formula $$R_1OOC—R_2—X—R_3—COOR_4$$

wherein $R_1$ and $R_4$ each represents hydrogen or an alkyl radical containing from 1 to 10 carbon atoms and $R_2$ and $R_3$ each represents $(CH_2)_{n-1}$, wherein $n$ is an integer of from 1 to 5 inclusive, and X represents a divalent aromatic radical of the formula

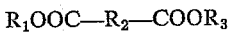

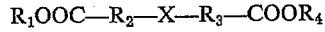

Y representing a radical of the formula $—(CH_2)_{n-1}—$;

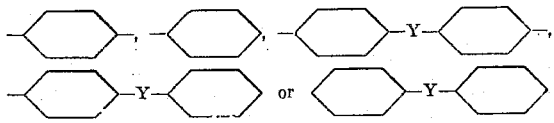

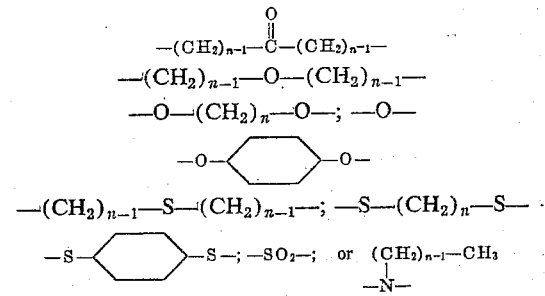

Of such acids, p,p'-sulfonyldibenzoic acid, terephthalic acid, 1,2-di(p-carboxyphenoxy) ethane, 1,2-di(p-carboxyphenyl) ethane and p,p'-diphenic acid are preferred, although any of the other acids or esters of such acids can be employed with good results.

The polyhydric alcohol or ester thereof is preferably an alpha, omega-dioxy compound having the formula $$R_5O-(CH_2)_p-OR_6$$

wherein $p$ is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols. The branched-chain glycols such as 2-methyl-pentanediol and 3-methyl-hexanediol can also be used. Other glycols which are suitable include the ether glycols such as diethylene glycol. Other polyhydroxy compounds containing 3 or more hydroxy radicals are also suitable as typified by glycerol, sorbitol, pentaerythritol, dipentaerythritol, β-methyl glycerol, 2-methyl-2-(hydroxymethyl)-1,3-propanediol, 1,2,4-trihydroxybutane, and similar polyhydroxy compounds. Thus it is apparent that the dihydroxy or polyhydroxy compounds used in practicing this invention need not be the free hydroxy compounds when a catalyst of the organo-metallic type is employed to promote the polyester formation. The polyhydric alcohol or ester thereof is desirably employed in an amount such that there is an excess of hydroxy or substituted hydroxy radicals over the amount of carboxyl groups in the polybasic acid or esters employed in the reaction. Generally speaking, the hydroxyl groups are desirably present in an amount of from about 1.3 to about 3 times the amount of carboxyl groups, although excess amounts of as much as 10 times or more can be employed in some cases.

It is thus apparent that the N-substituted amines described herein can be used for preparing any high molecular weight, high melting linear polyester having fiber-forming properties. For example, the aromatic dicarboxylic acids or diesters thereof which are preferably employed include such materials as β-hydroxyethyl diesters of p,p'-sulfonyldibenzoic acid, p,p'-sulfonyldibenzoic acid dibutyl esters, m,p'-sulfonyldibenzoic acid dipropyl esters, m,m'-sulfonyldibenzoic acid dihexyl esters, methyl terephthalate, hexyl terephthalate, isopropyl terephthalate, and various other esters having the following formulas:

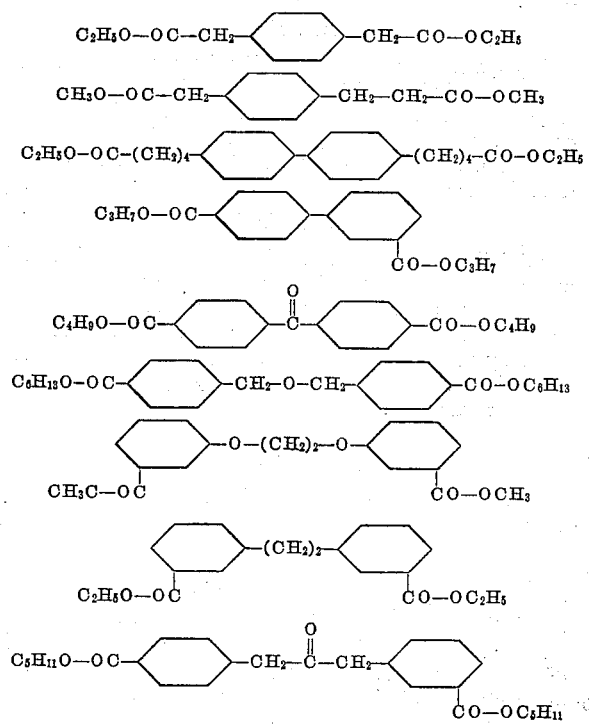

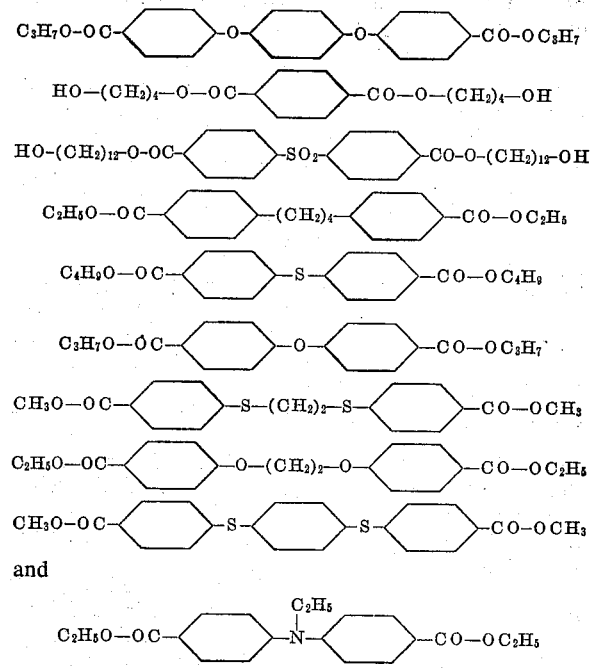

as well as the corresponding free acids.

The dihydroxy compounds which are preferably employed are the straight-chain alkane diols, i. e. the polymethylene glycols, wherein the hydroxy radicals are positioned at the two ends of the alkylene chain. As was indicated, the mono- or diesters of these glycols can also be employed, such as the acetates, propionates, and butyrates of these and similar glycols. Suitable ether glycols which can be employed instead of the polymethylene glycols or in conjunction therewith include diethylene glycol, triethylene glycol, tetraethylene glycol, bis-(4-hydroxybutyl) ether, bis(3-hydroxypropyl) ether, and similar ether glycols.

When preparing high melting polyesters for the manufacture of synthetic fibers, the amount of aliphatic ether glycol is desirably minimized. Furthermore, the aromatic diacids or diesters preferably contain only p,p' linkages when highly polymeric linear polyesters are desired.

When polyesters are prepared in accordance with this invention, the reaction is desirably effected under an inert atmosphere, and preferably under anhydrous conditions. The reaction is effected at atmospheric pressure, and at an elevated temperature for a period of about 1 hour. Thereafter it is usually desirable to reduce the pressure on the reaction mixture to below about 15 mm. Hg and to raise the temperature of the reaction mixture for a period of from 1 to 6 hours. This permits any alcohol or other volatile material to distill out of the highly viscous polymer melt.

The polymers thus obtained can then be employed in the preparation of fibers or other articles by the usual methods. The polyesters embodying this invention are especially suitable for conversion into fibers by melt-spinning methods. The spun fibers are usually drafted and heat treated in accordance with well known practice to give high melting synthetic fibers of excellent tensile strength.

The modified polyesters of this invention can also be employed for making sheets and films, or for the manufacture of molding products and similar materials. The polymers are readily dyed with cellulose acetate type dyes and also show some affinity for certain classes of acid wool, direct cotton and vat dyes. Although a dyeing assistant is not necessary, one can be used when particularly heavy or dark shades are desired.

The invention is illustrated by the following examples of certain preferred embodiments thereof. The examples are included merely for purposes of illustration and are

Example 1

Four hundred and twenty grams (1.0 mole) of p,p'-sulfonyldibenzoic acid dibutyl ester, 22 g. (0.25 mole) of N-ethyl ethanolamine, and 160 g. (1.5 moles) of pentamethylene glycol were placed in a reaction vessel equipped with a stirrer, a distillation column, and an inlet for purified nitrogen. The mixture was stirred at 150–160° C. for 1 hour to convert the N-ethyl ethanolamine to the amide by reaction with the ester present. The temperature was then raised to 200° C. and a solution of 0.2 g. titanium butoxide in 5 cc. butyl alcohol was added as catalyst. The distillation of butyl alcohol began a few minutes after the catalyst was added. After one hour the distillation of butyl alcohol practically stopped, and the temperature was raised to 260–265° C. The temperature was maintained at 260–265° C. for 30 minutes, and a vacuum of 0.1 mm. was applied. Stirring was continued for 1½ hours. A high viscosity, practically colorless polyester was obtained. The inherent viscosity as measured in a solution of 60 phenol-40 tetrachlorethane was 0.72.

Fibers were spun by extruding the melted polyester through a multi-hole spinneret. After drafting and heat-setting, the fibers had a tensile strength of 3.5 grams per denier and elongation of 27%. They stuck on the hot bar at 215–220° C. The fibers were readily dyed to dark shades with cellulose acetate dyes at the boil. Similar fibers made without the N-ethyl ethanolamine dyed to only a light tint under similar conditions.

Example 2

Ninety grams (1.0 mole) of N-ethyl ethanolamine and 100 g. (1.0 mole) of succinic anhydride were mixed and heated at 80–90° C. to give N-ethyl, N-hydroxyethyl succinamic acid $$HOOCCH_2CH_2CON(C_2H_5)CH_2CH_2OH$$

Four hundred and twenty grams (1.0 mole) of p,p'-sulfonyldibenzoic acid, 160 g. (1.5 moles) of pentamethylene glycol, and 30 g. (0.16 mole) of N-ethyl, N-hydroxyethyl succinamic acid were placed in a vessel equipped with a stirrer, a distillation column, and an inlet for purified hydrogen. The mixture was stirred at 190–200° C. for 1 hour in order to esterify the free carboxyl group of the succinamic acid. A solution of 0.3 g. sodium titanium butoxide in 10 cc. of butyl alcohol was then added as catalyst. Butyl alcohol was formed by ester-interchange and began to distil. The evolution of butyl alcohol practically stopped in 2 hours. The temperature was then raised to 265–270° C. and held for 30 minutes. A vacuum of 0.2 mm. was applied and stirring was continued for 2 hours. A product having an inherent viscosity of 0.67 in 60 phenol-40 tetrachlorethane was obtained.

Example 3

A product having similar properties was obtained according to the process of the preceding example using hexamethylene glycol instead of pentamethylene glycol.

Example 4

One hundred and thirty-seven grams (1.0 mole) of phenylethanolamine and one hundred grams (1.0 mole) of succinic anhydride were heated at 60–70° C. in three hundred cc. of dioxane. The dioxane was evaporated in vacuum to leave a syrupy residue of N-phenyl, N-hydroxyethyl succinamic acid, HOOCCH₂CH₂CONCH₂CH₂OH

Three hundred and sixty-five grams (1.0 mole) of p,p'-sulfonyldibenzoic acid diethyl ester, 47.4 g. (.2 mole) of N-phenyl, N-hydroxyethyl succinamic acid, and 160 g. (1.5 moles) of pentamethylene glycol were placed in a reaction vessel, as described in Example 2. The mixture was heated at 190–200° C. for 1½ hours in order to esterify the free carboxyl group of the succinamic acid. A solution of 0.2 g. sodium aluminum ethoxide in 5 cc. of ethyl alcohol was added as catalyst and the reaction was finished as described in Example 2. The product had an inherent viscosity of 0.75 in 60 phenol-40 tetrachlorethane.

Fibers spun from this polyester show exceptionally good affinity for cellulose acetate type dyes. The fibers stuck to the hot bar at 216–220° C.

Example 5

The acid chloride of p,p'-sulfonyldibenzoic acid was reacted with excess 4-phenylamino-butanol to give the diamide having the structure

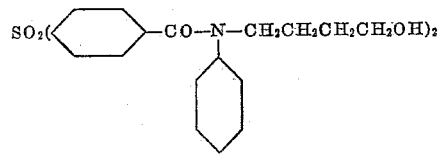

A polyester is prepared containing 0.10 mole of the diamide+0.90 mole, p,p'-sulfonyldibenzoic acid+1.0 mole hexamethylene glycol. Fibers spun from the polymer dye to heavy shades with cellulose acetate dyes.

Example 6

One molecular proportion of N,N'-diphenyl ethylene diamine was reacted with two molecular proportions of succinic anhydride to give the di-succinamic acid having the structure

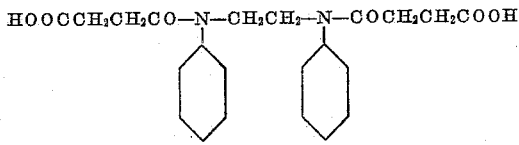

This product was used to the extent of 15 mole percent in a polyester with p,p'-sulfonyldibenzoic acid and pentamethylene glycol. Fibers made from the product dyed readily with cellulose acetate dyes.

Example 7

A polyester was prepared having the composition: 0.86 mole terephthalic acid+0.14 mole N-phenyl, N-hydroxyethyl succinamic acid (prepared as described in Example 4)+0.86 mole ethylene glycol. It gave fibers that stick to the hot bar at 210–215° C. The fibers dyed readily to dark shades with acetate dyes.

Example 8

N,N'-diphenyl trimethylenediamine was reacted with 2 molecular proportions of glutaric anhydride to give the diglutaramic acid. This product was used to the extent of 12 mole percent in a polyester with terephthalic acid and ethylene glycol. The product gave fibers that stick to the hot bar at 215–220° C. They dye well with cellulose acetate dyes.

Example 9

A polyester was made having the composition: 1.0 mole 1,2-di(p-carboxyphenyl) ethane+0.18 mole 5-ethyl-amino-pentanol+0.82 mole tetramethylene glycol. The fibers dye well with cellulose acetate dyes.

Similar results are obtained using other combinations of a polybasic organic acid, a polyhydric alcohol, and an N-substituted amine derivative as defined herein. As can be seen from the examples, either or both of the dibasic acid and the polyhydric alcohol can be esterified in practicing this invention, or both can be in the unesterified form. Mixtures of any of these or similar reactants can be employed in practicing the invention to give polymers having desired properties.

The polmers embodying the invention can be prepared in acordance with the usual processes for making polyesters, including either batch or continuous processes as desired. The products thus obtained are particularly valuable for preparing synthetic fibers of good mechanical properties and improved affinity for dyes. The modified polyesters, however, can be employed for making clear films which can be employed in the manufacture of photosensitive materials such as either black-and-white or color photographic film. Such films can be prepared in accordance with well known practice, either by deposition of a molten layer onto a suitable film-forming surface, or by deposition from a suitable solvent onto a rotating drum. The modified polymers of this invention can also be used for any of the other applications in which the prior polyesters could be used, since the desirable properties of the copolymer are retained in the terpolymer of this invention.

When using the modified polymers of this invention, any of the well known compounding in gredients which are ordinarily employed in conjunction with synthetic resins can be used, and the polymers can be admixed with similar or dissimilar polymers as desired. Fibers are most conveniently prepared from these polymers by melt-spinning processes, but the polymers can be spun from a solution in a suitable organic solvent such as dimethylformamide or dimethylacetamide if desired, in accordance with processes well known to the art.

Although the invention has been described in considerable detail with particular reference to certain preferred embodiments thereof, variations and modifications can be effected within the spirit and scope of the invention as described hereinabove, and as defined in the appended claims.

I claim:

1. The method of preparing improved linear polyesters which comprises reacting together at a temperature of 150–300° C. to an intrinsic viscosity of at least 0.4, a mixture of (1) a compound selected from the group consisting of dihydric alcohols of 2–12 carbon atoms and 2–4 carbon atom acyl esters thereof, (2) a compound selected from the group consisting of p-dicarboxylic aromatic acids and 1–4 carbon atom alkyl esters thereof, and (3) an N-substituted amine selected from the group consisting of N-alkyl hydroxy polymethylene amines containing 3–12 carbon atoms wherein the N-alkyl group contains 2–6 carbon atoms, N,N'-dialkyl polymethylene diamines containing 4–18 carbon atoms wherein each alkyl group contains 1–6 carbon atoms, and N,N'-diaryl polymethylene diamines containing 14–22 carbon atoms wherein each of said aryl groups contains 6–8 carbon atoms, said polyester containing 5–20 mole percent of said amine and at least 1.3 times as much of said compounds (1) as said compound (2).

2. The method according to claim 1 wherein said amine is an N-alkyl hydroxy polymethylene amine containing from 3 to 12 carbon atoms, said N-alkyl group containing from 2 to 6 carbon atoms.

3. The method according to claim 1 wherein said amine is an N,N'-dialkyl polymethylene diamine containing from 4 to 18 carbon atoms, each of said alkyl groups containing from 1 to 6 carbon atoms.

4. The method according to claim 1 wherein said amine is an N,N'-diaryl polymethylene diamine containing from 14 to 22 carbon atoms, each of said aryl groups containing from 6 to 8 carbon atoms.

5. The method according to claim 1 wherein said amine is pre-reacted with an aliphatic dicarboxylic acid anhydride and the resulting product is reacted with said polyhydroxylic compound and said polycarboxylic compound.

6. A linear fiber-forming polyester of (1) a compound selected from the group consisting of p-dicarboxylic aromatic acids and 1–4 carbon atom alkyl esters thereof, (2) a compound selected from the group consisting of dihydricalcohols containing 2–12 carbon atoms and 2–4 carbon atom acyl esters thereof, and (3) an N-substituted amine selected from the group consisting of N-alkyl hydroxy polymethylene amines containing 3–12 carbon atoms wherein the N-alkyl group contains 2–6 carbon atoms, N,N'-diakyl polymethylene diamines containing 4–18 carbon atoms wherein each alkyl group contains 1–6 carbon atoms and N,N'-diaryl polymethylene diamines containing 14–22 carbon atoms wherein each aryl group contains 6–8 carbon atoms, said polyester having an intrinsic viscosity of at least 0.4 and containing 5–20 mole percent of said amine and at least 1.3 times as much of said compound (1) as said compound (2).

7. A linear polyester according to claim 6 wherein the amine is an N-alkyl hydroxy polymethylene amine containing from 3 to 12 carbon atoms, said N-alkyl group containing from 2 to 6 carbon atoms.

8. A linear polyester according to claim 6 wherein said amine is an N,N'-diakyl polymethylene diamine containing from 1 to 6 carbon atoms.

9. A linear polyester according to claim 6 wherein said amine is an N,N'-diaryl polymethylene diamine containing from 6 to 8 carbon atoms.

10. A linear polyester according to claim 6 wherein the amine is in the form of an amide of succinic anhydride.

11. A synthetic fiber consisting of a linear polyester as defined in claim 6.

References Cited in the file of this patent

UNITED STATES PATENTS

| | | |
|---|---|---|
| 2,417,513 | Nelles et al. | Mar. 18, 1947 |
| 2,647,104 | Shivers | July 28, 1953 |
| 2,740,764 | Nischk et al. | Apr. 3, 1956 |